United States Patent [19]

Pickett

[11] 4,269,018
[45] May 26, 1981

[54] BEAN DIVIDER

[76] Inventor: John P. Pickett, Rte. 1, Murtaugh, Id. 83344

[21] Appl. No.: 81,157

[22] Filed: Oct. 2, 1979

[51] Int. Cl.³ .................. A01D 45/02; A01D 63/00
[52] U.S. Cl. .................................... 56/119; 56/314
[58] Field of Search ............... 56/119, 98, 314, 315, 56/316, 317, 318, 319, 320, 229

[56] References Cited

U.S. PATENT DOCUMENTS

| | | | |
|---|---|---|---|
| 694,441 | 3/1902 | Steward | 56/319 |
| 2,466,555 | 4/1949 | Paine et al. | 56/229 |
| 2,653,436 | 9/1953 | Warner | 56/314 |
| 2,701,434 | 2/1955 | Christopherson | 56/314 |
| 3,421,303 | 1/1969 | Kammerzell | 56/229 |

Primary Examiner—Robert A. Hafer
Attorney, Agent, or Firm—John E. Benoit

[57] ABSTRACT

A bean divider mechanism which is adapted to be attached to a drawing vehicle. The mechanism includes one or more bean dividers each attached to a horizontal support bar by substantially parallel plates pivotally attached to the bean divider.

5 Claims, 3 Drawing Figures

BEAN DIVIDER

This application relates to bean dividers, and more specifically to dividers which have a unique mounting mechanism for attaching them to the vehicle which is used in the field.

BACKGROUND OF THE INVENTION

The use of bean dividers for harvesting crops has been well known for a number of years. The use of such devices has effectively provided a harvesting operation greatly reducing the damage done to the crops during the harvesting process.

Two major problems exist with bean dividers which are now in use. The first problem is that each of the individual dividers which subtend from the mounting on the vehicle have a tendency to angle downwardly when hitting an obstruction and thus dig into the ground itself, thereby interrupting the operation that occurs during a normal harvesting. The second problem is that most bean dividers are supported vertically and operate during all operations with only the ability to slightly raise them above ground level. This requires additional maneuvering of the vehicle when moving to different rows and prevents the movement of the vehicle over ditch banks and the like when turning around, with possible damage to the dividers themselves.

Accordingly, it is an object of this invention to provide a bean divider which prevents the dividers from being forced downwardly into the ground and hitting any obstructions or sudden rises in the ground.

Another object of this invention is to provide a support mechanism for bean dividers which may raise the entire bean divider mechanism to a basically horizontal position, thereby clearing obstructions and allowing maneuverability of the vehicle which is carrying the divider.

These and other objects will become apparent from the following description taken together with the related drawings.

DETAILED DESCRIPTION OF A PREFERRED EMBODIMENT OF THE INVENTION

Figure 1:
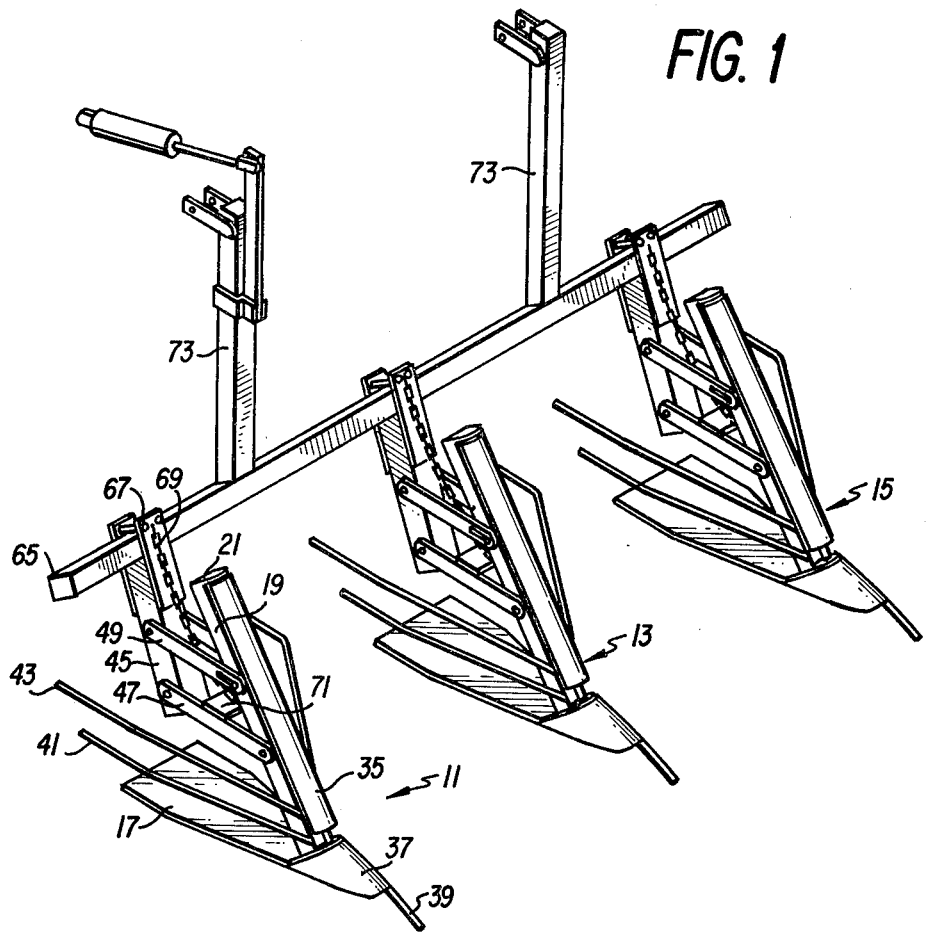
FIG. 1 is a perspective view of the mechanism of the present invention showing three bean dividers and associated support.

Turning now more specifically to the drawings, there are shown in FIG. 1 three standard type bean dividers 11, 13, and 15. These dividers include a shoe 17, divider rods 41 and 43, a cover 37, and a front rod 39. This is the standard equipment which has been adapted to be used with the support mechanism of the present invention.

Figure 3:
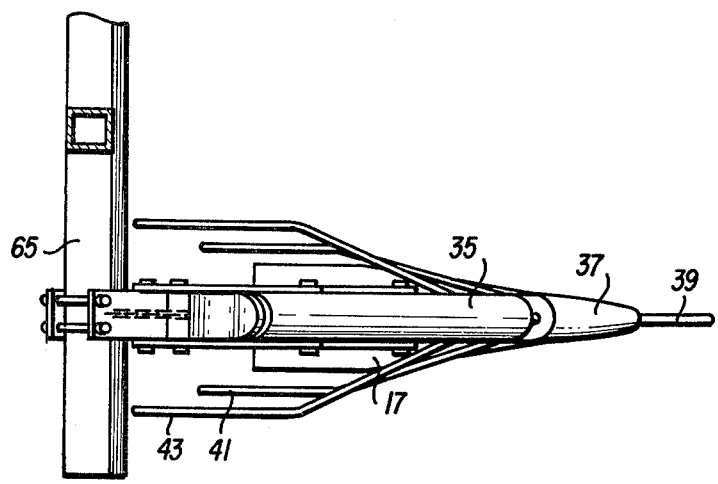
FIG. 3 is a plan view of one of the bean dividers shown in FIG. 1.
Figure 2:
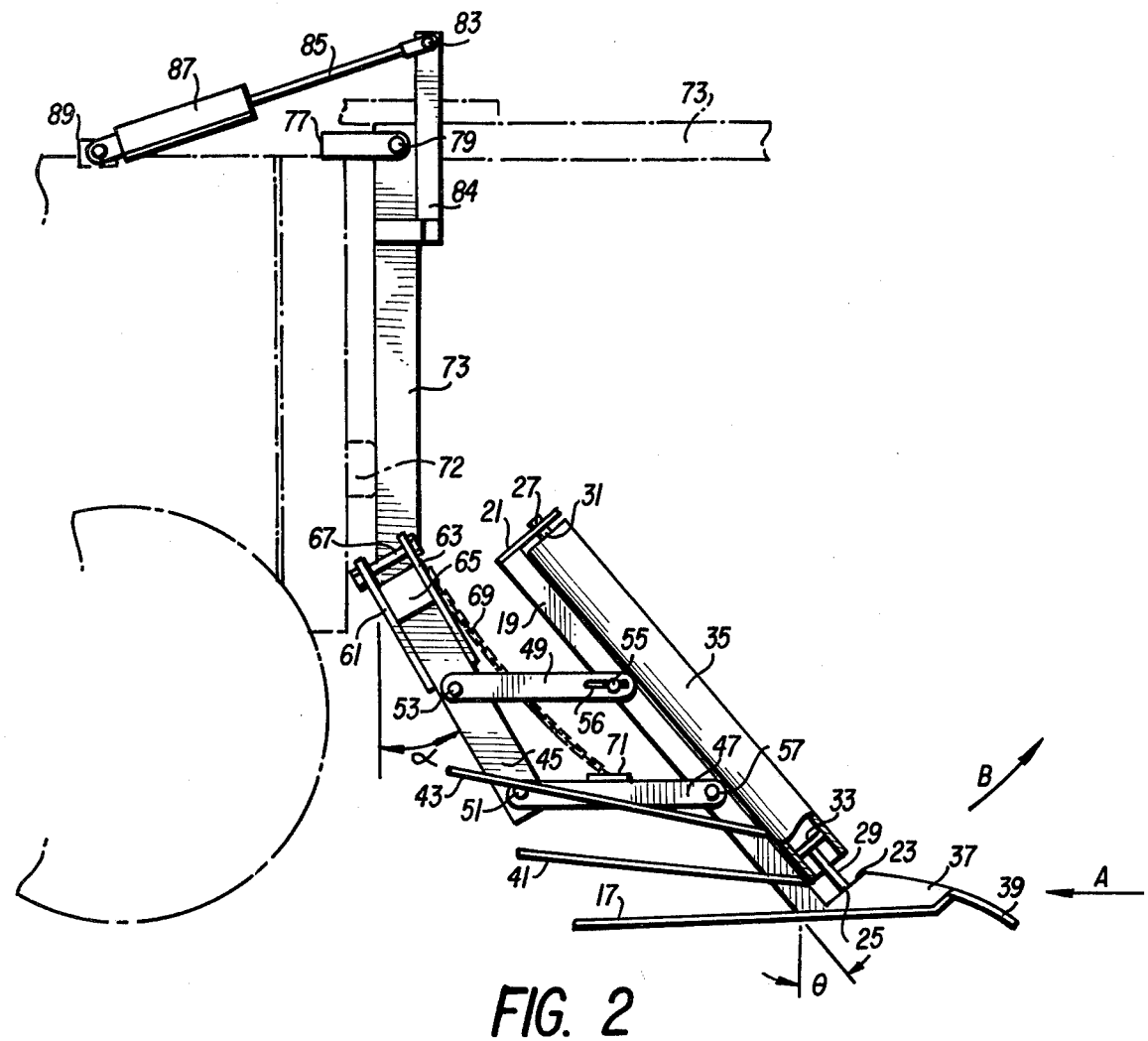
FIG. 2 is a side elevational view showing one of the dividers and the mounting thereof to the vehicle.

It is believed that the specific details of the mechanism will be more apparent with reference to FIGS. 1, 2 and 3 wherein it can be seen that a support bar 19 is secured to the shoe 17 by means such as welding. The angle of attachment is such that the shoe 17 will be slightly rearwardly inclined when the divider is assembled. Plates 21 and 23 are welded to either end of the support bar 19 and extend outwardly therefrom and have roller bearings 25 and 27 therethrough. Rods 27 and 29 extended through the roller bearings 25 and 27 and are welded to a circular plate within a pipe 35. One such circular plate 33 is shown in a broken-away section of pipe 35. This allows pipe 35 to freely rotate so as not to interfere with any foliage passing over the pipe during the dividing operation.

Bar 45 is connected to bar 19 by means of parallel plates 47 and 49 which are pivotally connected as shown at 51, 53, 55, and 57. It should be noted that the pivot 51 is located near the forward edge of bar 45 while pivot 53 is located at the rearward edge thereof so as to assure that bar 19 will be at an angle $\theta$ to the vertical greater than angle $\alpha$ (to be discussed below). The same results could be obtained by having plate 47 longer than plate 49. This effectively provides a parallelgram support system for the bean divider itself. Slot 56 in plate 49 together with securing bolt 57 provides an adjustment so that the shoe 17 may ride properly with greater ground pressure at its rearward end than at the forward end. This adjustment feature is required in order to compensate for variations in the angle $\alpha$ during the welding operation while the divider is being manufactured. It is to be understood that there are matching plates such as 47 and 49 on the other side of the bar and that all of the individual dividers and the supports therefor are identical.

Cross bar 65 provides the support for all of the bean dividers shown in FIG. 1. This support is provided by means of plates 61 and 63 which are welded to bar 45 and extend thereabove with a plurality of holes for providing means to attach the mechanism to the bar 65 by means of bolts 67 or the like. A chain 69, secured between bolt 67 and a cross plate 71, extends between the two lower plates 47. This chain is provided so as to maintain the divider itself in substantially the position as shown when the entire mechanism is rotated 90° as will be described.

Cross bar 65 is welded to the vertical bar 73. Vertical bar 73 has been cut at its lower end so that the bar 65, when welded thereto, provides an angle $\alpha$ of substantially 30°. Again, the relationship between the angles as herein described is of prime importance to the operation of the mechanism as a whole. To operate properly $\theta$ must be greater then $\alpha$. This relationship assures that any forces impressed by obstacles on the front of the divider as indicated by arrow A will always cause the divider to move upwardly in the direction of arrow B.

Vertical bar 73 rests against stop 72 and is pivoted to the bracket 77, which is welded to the tractor or vehicle which is to be driven, at a pivot 79. Plate 84 is welded to the vertical bar 73 and extends thereabove and terminates at pivot 83 to which is connected the stroke arm 85 of a hydraulic ram 87 which is itself pivoted to a bracket 89 welded to the vehicle.

As stated above, with the stated relationship between angles $\theta$ and $\alpha$, the operation of the device, as has been proven in actual tests, prevents the shoe and the front rod 39 from digging into the ground when obstructions are met. The angles cause shoe 17 to ride firmly on the ground at its rear end with any action which will cause tilting of the divider being in a direction so that the front end of the divider rises rather than falls. A preferred relationship between angles is $\alpha = 30°$ and $\theta = 40°$.

The above described mechanism also allows the entire divider and mechanism to be raised free and clear from the ground by use of the hydraulic ram 87 which raises the vertical rod 73 into a substantially horizontal position as indicated by the dash lines in FIG. 2. This allows maneuverability of the vehicle with the divider maintained above obstructions such as canal banks and the like when going from row to row.

The vehicle is shown in phantom in FIG. 2 in order to avoid any confusion in the drawings since such a vehicle forms no part of the present invention.

The above described invention overcomes two major problems which are inherent with the present bean dividers and allows a continuous smooth operation during harvesting. The description and drawings are illustrative only and, therefore, the invention is to be limited only by the scope of the following claims.

I claim:

1. A bean divider mechanism for attachment to a drawing vehicle comprising
   at least one bean divider including a shoe;
   a first support bar secured to said divider and extending upwardly therefrom;
   at least one substantially vertical bar;
   means for pivotally securing said vertical bar to said driving vehicle;
   a substantially horizontal bar secured to the lower end of said vertical bar;
   a second support bar secured to said horizontal bar and subtending therefrom at a predetermined angle $\alpha$ from the vertical;
   means for pivotally supporting said first support bar relative to said second support bar, said first support bar being at an angle $\theta$ to the vertical greater than said angle $\alpha$.

2. The apparatus of claim 1 further comprising means connected to said first support bar for adjusting said angle $\theta$.

3. The apparatus of claim 1 further comprising means secured between said vehicle and said vertical bar for pivotally rotating said vertical bar into a substantially horizontal position.

4. The apparatus of claim 1 wherein said means for pivotally supporting said first support bar relative to said second support bar comprises
   substantially parallel plates pivotally extending between said first support bar and said second support bar.

5. The apparatus of claim 4 further comprising
   a slot in one arm of said parallel plates adjacent a pivot point on said first support bar; and
   means extending through said slot for selectively securing said one arm to said first support bar.

* * * * *